United States Patent Office 3,308,093
Patented Mar. 7, 1967

3,308,093
TRIMETHYLSILOXY ENDBLOCKED
DIMETHYLSILOXANES
Charles W. Lentz, Midland, Mich., assignor to Dow Corning Corporation, Midland, Mich., a corporation of Michigan
No Drawing. Filed Aug. 28, 1963, Ser. No. 305,207
11 Claims. (Cl. 260—46.5)

This invention relates to dimethylsiloxanes containing trimethylsiloxy endblocking groups.

More specifically, this invention relates to siloxanes having the general formulae

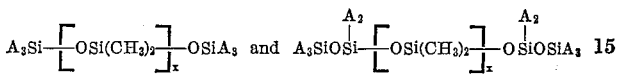

wherein A is a trimethylsiloxy group, that is, a $(CH_3)_3SiO$- group, and $x$ is an integer equal to at least 1.

This invention also relates to a method for preparing the above siloxanes.

The best methods known at this time for preparing the above compounds are given below.

When $x$ is 1, the compounds are prepared by reacting dimethyldichlorosilane, $(CH_3)_2SiCl_2$, with tris (trimethylsiloxy)silanol, $[(CH_3)_3SiO]_3SiOH$, or penta(trimethylsiloxy)hydroxydisiloxane,

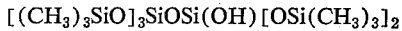

in the presence of an HCl acceptor, the mole ratio of the dimethyldichlorosilane to the other material being about 1 to 2. When $x$ is 2 or greater, that is for example when $x$ is 2, 3, 4, 5, 10, 15, 25, 50, 100 and higher, chlorine endblocked dimethylsiloxanes having the general formula

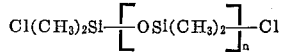

wherein $n$ is an integer equal to at least 1, are used instead of the symmetrical tetramethyldichlorodisiloxane. The chlorine endblocked dimethylsiloxanes are well known materials and can be prepared, for example, by the process disclosed in U.S. Patent 2,779,776.

Alternative methods that can be employed for preparing the compounds of this invention consist of using a silane or siloxanes which are the same as the ones described in the method above except that they contain hydroxy, acyloxy or alkoxy groups instead of the chlorine atoms. These materials are also well known and can be prepared by means set forth in the patent referred to above or by means which are already well known to those skilled in the art. Specific examples of acyloxy and alkoxy endblocking groups that can be employed are the acetoxy, formloxy, methoxy, ethoxy and isopropoxy groups.

The liquid compounds of this invention are useful, for example, as "fluid springs," hydraulic fluids and lubricants. The solid compounds of this invention are useful, for example, as ingredients in polishes and waxes. The solid compounds can also be dissolved in a solvent and the solvent solution employed to cast a protective film of the siloxane on glass, metals, etc.

In order that those skilled in the art can better understand how the present invention can be practiced, the following examples are given by way of illustration and not by way of limitation.

In the examples, the purity of the compounds was confirmed employing an F and M Vapor Phase Chromatography Model 500 apparatus and the structure of the compounds confirmed by infrared spectroscopy.

Example 1

465 g. of $\{[(CH_3)_3SiO]_3Si\}_2O$ was dissolved in 500 ml. of toluene, placed in a three liter flask and cooled to 2° C. Then 112 g. of $AlCl_3$ was added over a period of about 7 minutes, a maximum temperature of 9° C. being reached during the addition. The mixture was stirred an additional 5 minutes and then added to one liter of 10 percent HCl over a period of about 10 minutes, a maximum temperature of 10° C. being reached during the addition to the HCl. The solution was then washed two more times with cold 10 percent HCl (5 minutes each) and then twice with water. Finally the mixture was treated with CaO and then filtered through filter aid.

The above procedure was repeated and then the two toluene solutions obtained were combined. The toluene solution was azeotroped yielding 4 to 5 ml. of water and then stripped to remove the toluene. The remaining liquid was filtered and then fractionated into four cuts of 100 ml., 50 ml., 50 ml. and 15 ml. By Gas-Liquid Chromatographic anaylsis they contained 78 percent, 72 percent, 55 percent and 51 percent, respectively, of $[(CH_3)_3SiO]_3SiOSi(OH)[OSi(CH_3)_3]_2$ The four cuts were combined for refractionation. 135 g. (about 100 cc.) of $[(CH_3)_3SiO]_3SiOSi(OH)[OSi(CH_3)_3]_2$ was obtained at a temperature of 88–89° C. and about .15 mm. of pressure.

Example 2

21.56 g. of the $[(CH_3)_3SiO]_3SiOSi(OH)[OSi(CH_3)_3]_2$ prepared in Example 1 was added to a mixture of 2.4 ml. of $(CH_3)_2SiCl_2$, 100 ml. of toluene and 4 ml. of alpha-picoline in a flask at room temperature. The mixture was heated to melt the alpha-picoline hydrochloride and then allowed to stand overnight. The liquid layer was decanted, washed with water, dilute HCl and finally with water again. The mixture was then dried, filtered and then the toluene stripped off. The sample was then placed in a 500° F. oven for 15 minutes to devolatilize, that is, to remove all low boiling materials leaving the desired compound behind. Upon cooling, the remainder of the sample crystallized to a waxy feeling solid. This waxy solid was

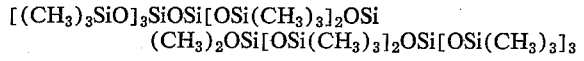

Example 3

22.4 g. of the $[(CH_3)_3SiO]_3SiOSi(OH)[OSi(CH_3)_3]_2$ prepared in Example 1 was added in one hour to a mixture of 5.35 ml. of $[Cl(CH_3)_2Si]_2O$, 4.1 ml. of alpha-picoline and 150 ml. of toluene. The mixture was stirred for 30 minutes, then heated to melt the alpha-picoline hydrochloride and then allowed to stand overnight. The liquid layer was decanted, then washed once with an HCl solution, and then washed several times with water and sodium bicarbonate solution. The mixture was then filtered, azeotroped and stripped to a pot temperature of 140° C. The mixture was then shaken with CaO for 5 minutes and then the sample was dried. The mixture was then filtered and placed in a fractionating column where it was heated to a pot temperature of 266° C. at about .25 mm. of pressure over a period of about 5 hours and 20 minutes. This removed low boiling materials and left 21 g. of a material in the pot which solidified to a waxy solid upon cooling. The solid remaining in the pot was

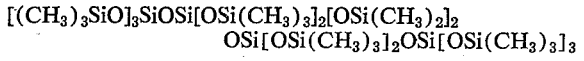

Example 4

When chlorine endblocked siloxanes having the general formula

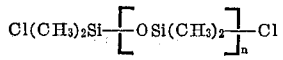

wherein n is an integer equal to at least 2, are substituted for the [Cl(CH$_3$)$_2$Si]$_2$O of Example 3 in equivalent amounts, siloxanes having the general formula

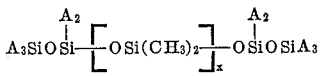

wherein A is a trimethylsiloxy group and $x$ is an integer equal to at least 3, are obtained. The products obtained when $n$ has a given value are tabulated below.

| Starting material: $n=$ | Product $x=$ |
|---|---|
| 2 | 3 |
| 3 | 4 |
| 5 | 6 |
| 10 | 11 |
| 14 | 15 |
| 25 | 26 |
| 50 | 51 |
| 74 | 75 |
| 100 | 101 |
| 510 | 511 |

Example 5

To a 500 ml. flask, 200 ml. of toluene, 20 ml. of alpha-picoline and 12 ml. of (CH$_3$)$_2$SiCl$_2$ were added. While the foregoing mixture was being stirred, 72.6 g. of [(CH$_3$)$_3$SiO]$_3$SiOH was added over a period of one hour. Upon completion of the addition, the mixture was stirred another 20 minutes at room temperature and then heated to melt the alpha-picoline hydrochloride. After heating for about 40 minutes the heat was turned off and the agitator stopped. The solution was then allowed to stand overnight. The toluene solution was then separated from the solid. The toluene solution was then washed with an HCl solution and then washed with water. The solution was then dried with sodium sulfate. After drying, the solution was azeotroped and stripped to a pot temperature of 150° C. The remaining liquid was then fractionated with 55 g. (about 62 cc.) of pure

[(CH$_3$)$_3$SiO]$_3$SiOSi(CH$_3$)$_2$OSi[OSi(CH$_3$)$_3$]$_3$ being obtained at a temperature of 105–110° C. and about .3 mm. of pressure.

Example 6

To a 2 liter, three necked, flask equipped with a thermometer, stirrer and addition funnel, 550 ml. of toluene, 36 ml. of (CH$_3$)$_2$SiCl$_2$ and 60 ml. of alpha-picoline were added. Then, while stirring, 217.8 g. of [(CH$_3$)$_3$SiO]$_3$SiOH (about 90 percent pure) was added to the mixture dropwise at 20 to 30° C. over a period of about 2 hours. Upon completion of the addition, the addition funnel was rinsed with 50 ml. of toluene and the stirring continued for ½ hour. The mixture was then heated enough to melt the alpha-picoline hydrochloride and then allowed to stand, without agitation, until cool. The solid was then removed and the remaining liquid washed four times, the first wash being with 1000 ml. of a 5 percent HCl solution and the last three washes being with 1000 ml. of water. Next the mixture was azeotroped and stripped to a pot temperature of 150° C. to remove most of the toluene. The remaining liquid was then fractionated with 149.5 g. (about 143 cc.) of

[(CH$_3$)$_3$SiO]$_3$SiOSi(CH$_3$)$_2$OSi[OSi(CH$_3$)$_3$]$_3$ being collected over a temperature range of 107 to 113° C. at about .3 mm. of pressure. The viscosity of this compound is 11.7 c.p.s. at 25° C.

Example 7

The procedure of Example 6 was repeated except that 550 ml. of toluene, 60.5 ml. of [Cl(CH$_3$)$_2$Si]$_2$O, 61.5 ml. of alpha-picoline and 225 g. of [(CH$_3$)$_3$SiO]$_3$SiOH were employed as the starting materials. Fractionation of the product yielded 157.7 g. (about 188 cc.) of

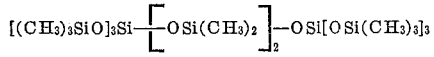

over a temperature range of 133 to 139° C. at about .65 mm. of pressure. The viscosity of this compound is 12.0 c.p.s. at 25° C.

Example 8

The procedure of Example 6 was repeated except that 550 ml. of toluene, 82 ml. of

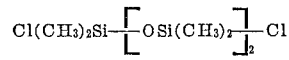

60 ml. of alpha-picoline and 217.5 g. of

[(CH$_3$)$_3$SiO]$_3$SiOH were employed as the starting materials. Fractionation of the product yielded 177 g. (about 181 cc.) of

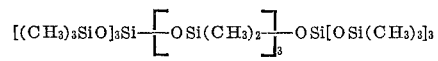

over a temperature range of 142 to 149° C. at about .6 mm. of pressure. The viscosity of this compound is 13.7 c.p.s. at 25° C.

Example 9

The procedure of Example 6 was repeated except that 550 ml. of toluene, 104.5 ml. of

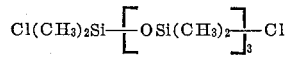

60 ml. of alpha-picoline and 217.8 g. of

[(CH$_3$)$_3$SiO]$_3$SiOH were employed as the starting materials. Fractionation of the product yielded about 150 g. (about 160 cc.) of

over a temperature range of 138–164° C. at about .7 mm. of pressure. The viscosity of this compound is 15.0 c.p.s. at 25° C.

Example 10

When chlorine endblocked siloxanes having the general formula

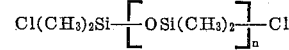

wherein $n$ is an integer equal to at least 4, are substituted for the [Cl(CH$_3$)$_2$Si]$_2$O of Example 7 in equivalent amounts, siloxanes having the general formula

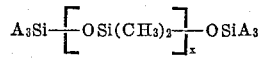

wherein A is a trimethylsiloxy group and $x$ is an integer equal to at least 5, are obtained. The products obtained when $n$ has a given value are tabulated below.

| Starting material: $n=$ | Product $x=$ |
|---|---|
| 4 | 5 |
| 5 | 6 |
| 10 | 11 |
| 15 | 16 |
| 49 | 50 |
| 62 | 63 |
| 100 | 101 |

That which is claimed is:
1. A siloxane selected from the group consisting of siloxanes having the general formulae

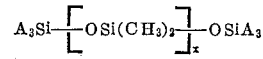

and

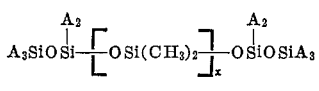

wherein A is a trimethylsiloxy group and $x$ is an integer equal to at least 1.

2. A siloxane according to claim 1 which has the general formula

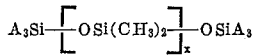

3. A siloxane according to claim 2 which has the formula $A_3SiOSi(CH_3)_2OSiA_3$.

4. A siloxane according to claim 2 which has the formula

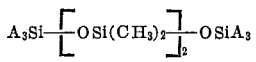

5. A siloxane according to claim 2 which has the formula

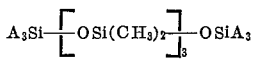

6. A siloxane according to claim 2 which has the formula

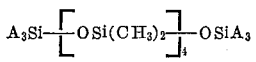

7. A siloxane according to claim 1 which has the general formula

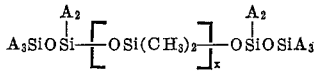

8. A siloxane according to claim 7 which has the formula

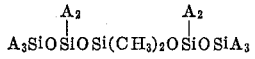

9. A siloxane according to claim 7 which has the formula

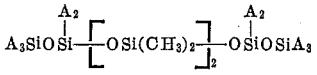

10. A siloxane according to claim 7 which has the formula

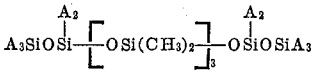

11. A siloxane according to claim 7 which has the formula

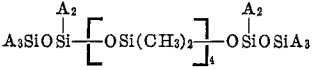

No references cited.

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,308,093                                March 7, 1967

Charles W. Lentz

It is hereby certified that error appears in the above numbered patent requiring correction and that the said Letters Patent should read as corrected below.

Column 3, line 69, and column 4, lines 8, 26 and 44, for "c.p.s.", each occurrence, read -- c.s. --.

Signed and sealed this 7th day of November 1967.

(SEAL)
Attest:

Edward M. Fletcher, Jr.                             EDWARD J. BRENNER

Attesting Officer                                         Commissioner of Patents